United States Patent [19]
Davidson et al.

[11] Patent Number: 5,307,490
[45] Date of Patent: Apr. 26, 1994

[54] METHOD AND SYSTEM FOR IMPLEMENTING REMOTE PROCEDURE CALLS IN A DISTRIBUTED COMPUTER SYSTEM

[75] Inventors: Thomas J. Davidson; Michael T. Kelley, both of Austin, Tex.

[73] Assignee: Tandem Computers, Inc., Cupertino, Calif.

[21] Appl. No.: 938,102

[22] Filed: Aug. 28, 1992

[51] Int. Cl.⁵ .............................. G06F 13/00
[52] U.S. Cl. ..................... 395/650; 364/DIG. 1; 364/280.6; 364/230.3; 364/281.3
[58] Field of Search ............ 364/DIG. 1 MS File, 364/DIG. 2 MS File; 395/650, 600, 725

[56] References Cited

U.S. PATENT DOCUMENTS 4,887,204 12/1989 Johnson et al. .............. 364/DIG. 1
4,914,586 4/1990 Swinehart et al. ............ 364/DIG. 1
5,187,790 2/1993 East et al. .................... 364/DIG. 1

Primary Examiner—Thomas M. Heckler
Attorney, Agent, or Firm—Skjerven, Morrill, MacPherson, Franklin & Friel

[57] ABSTRACT

A system and a method for implementing remote procedure calls in a distributed computer system provide a base object class from which all distributed objects can be derived. A program extracting all classes derived from the base class provides an inheritance tree to allow down casting from a root class to a base class and to allow passing high level data structure between participants of a remote procedure call. An Unix script provides stub routines for implementing a client-server model communicating processes.

20 Claims, 17 Drawing Sheets

Microfiche Appendix Included
(247 Microfiche, 4 Pages)

```
class SharedThangId {
public
    // constructors /destructor
    SharedThangId(SharedThang *);
    virtual ~SharedThangId();

operator unsigned() const { return id; }
    void addClient(RpcClient *, unsigned);
    void addMaster(RpcClient *, unsigned);

//protected:  work on protection later (mtk)

friend class SharedThang;

unsigned id;
        List<RemoteId> slaves;
        RemoteId master;

static SharedThang **list;
        statis unsigned listCount;

static unsigned listMax;
};

class SharedThang : public Thang {
public:
    // desctructor /constructors
    SharedThang();
    virtual ~SharedThang();

//methods
    const SharedThangId& id() const { return *stid; }
    SharedThangId& id() { return *stid; }
    const RemoteId& masterId() const { return std->master; }
    RemoteId& masterId() { return stid->master; }
    const ClassInfo& getCommonType() const { return *commonType; }
    virtual void changeNotify(const SharedThang*) const;
    virtual Lock *lock() const;
    static int count();
    static SharedThang* get(unsigned, Boolean = TRUE, SharedThang * = 0);
protected:
    SharedThangId *stid;
    const ClassInfo *commonType;

// the next three friends are declared in RpcUtil.h
    friend void joinWithMaster(SharedThang*, u_long, const char*, RpcClient*, unsigned, void*
        = 0);

friend void joinWithSlave(SharedThang*, RpcClient*, unsigned);
    friend void notify(const SharedThang*, NotifyMessage);

private:
    // in order to make them inaccesible, and to prevent cfront from
    // generating them.

SharedThang(const SharedThang&);
    SharedThang& operator=(const SharedThang&);

public:
    // hook for exporting: stid→master.connectionDied
    static ExportedVar exports[ 2 /* num_exported + 1 */];};
```

```
class RemoteId (
public:

Remote(RpcClient *c, unsigned i)
                : client(c), id(i), connectionDied(FALSE)
        ~RemoteId()
        operator         unsigned() const
        RpcClient        *client;
        unsigned         id;
        Boolean          connectionDied;
);
```

FIG. 1(2)

```
/**/#!/bin/sh
/**/#
/**/# $Id: chomp.cpp,v 1.14 92/07/16 11:06:50 francis Exp $
/**/#
TMPDIR = ${TMPDIR-/tmp}
MYDIR = $TMPDIR/chomp$$
trap 'rm -rf $MYDIR; exit' 1 2 3 15
mkdir $MYDIR
GENTYPE = ${GENTYPE-GENTYPECMD}
LDWHERE = ${LDWHERE-LDWHERECMD}
ARCH = ${ARCH-'arch'}
EXCLUDE = ${EXCLUDE-"lib(Xm | Xt | Xmu | X11 | c | l | g | gen | socket | ucb | nsl | m | C)[.]a"} libs = ""
for lib in '$LDWHERE $*'; do
      l ='basename $lib'
      result='echo $1 | awk "\\$1 ~/$EXCLUDE/'
      if [ x$result = x]; then
            libs = "$libs $lib"

fi
done if test "$ARCH" = "sun4"; then
      nm -u $libs | egrep '__magic__' | sed "s/^_//" | sort -u | $GENTYPE
else
      nm -Bu $libs | sed -e 's/^0* *U //g' | grep__magic__ | sort -u | $GENTYPE
fi
rm -rf $MYDIR
```

FIG. 3b

```
static          ofstream        errorsFile("/var/adm/setd.log", ios::out);
extern  "C" void                sectdProg_1(svc_req*, SVCXPRT*);
extern      "C" void    openlog(const char*, int, int);

static void
tellSomebody(Exception& e)
{
        try {
                    cout << e << endl;
        }
        catch (Exception& ex) {
                    tellSomebody(ex);
        }

} void *
initializeDaemon(RpcArg*, struct svc_req*)
{
        errorsFile << "initializeDaemon called..." << endl;
        return NULL;
} main(Cardinal argc, char **argv)
{
        openlog("sectd", LOG_PID, LOG_DAEMON);

if (startedByInetd(0)) {
                    cerr = errorsFile;
                    cout = errorsFile;
                    putenv("GIFTS_DEBUG=all");
        } try {

Gifts   appl("sectd", "Sectd", NULL, 0, &argc, argv);

cout << "sectd started." << endl;

// Create a control object so our clients can speak to us.

SectController   *ctl = new SectController();

// Right, nothing left but the shouting!

antenna.link(new RpcServer(SECT_PROG, SECT_VERS, sectdProg_1));

antenna.select();
        }
        catch (Exception& ex) {
                    tellSomebody(ex);
        }
}
```

FIG. 4(b)

```c
static char *rcsid = "$Id: sectdProg.c,v 1.3 92/04/29 14:00:04 francis Exp $";
/*
 *    (c) Tandem Computers Incorporated 1991.
 *
 */
#define _NO_FUNCTION_PROTOTYPES
#include <stdio.h>
#include <rpc/rpc.h>
#include <rpc/clnt.h>
#include <Oz/Wrappers.h>
#include <gifts/sect.h>
include <shared-libs/sectWrap.h> extern void *initializeDaemon_FP6RpcArgP7svc_req();

void
sectdProg_1(rqstp, transp)
    struct svc_req *rqstp;
    SVCXPRT *transp;
{
    RpcArg argument;
    char *result;
    bool_t (*xdr_argument) (), (*xdr_result) ();
    char * (* local) ();

switch (rqstp->rq_proc) {
    case NULLPROC:
        (void)svc_sendreply(transp, xdr_void, (char *)NULL);
        return;
    case JOIN_WITH_SLAVE_1:
        xdr_argument = xdr_RpcArg;
        xdr_result = xdr_RpcArg;
        local = (char * (*) ()  )
            rjoinWithSlave_FP11SharedThangP9RpcClient_U1;
        break;
    case RPCCLIENT_9RPCCLIENT_1:
        xdr_argument = xdr_RpcArg;
        xdr_result = xdr_RpcArg;
        local = (char *(*)()) rct_9RpcClientFPCcU1U1R8ManifestU1PC9RpcHandlePC7timeval;
        break;
    case INITIALIZE_DAEMON_1:
        xdr_argument = xdr_RpcArg;
        xdr_result = xdr_RpcArg;
        local = (char *(*)()) initializeDaemon_FP6RpcArgP7svc_req;
        break;
    case PING_9RPCCLIENT_1:
        xdr_argument = xdr_RpcArg;
        xdr_result = xdr_RpcArg;
        local = (char *(*)()) rping_9RpcClientFR1;
        break;
#include <shared-libs/sectdSvcCases.c>
    default:
        svcerr_noproc(transp);
        return;
    }
    bzero((char *)&argument, sizeof(argument));
    if (!svc_getargs(transp, xdr_argument, &argument)) {
        svcerr_decode(transp);
        return;
    }
    result = (*local) (&argument, rqstp);
    if (result != NULL && !svc_sendreply(transp, xdr_result, result)) {
        svcerr_systemerr(transp);
    }
    if (!svc_freeargs(transp, xdr_argument, &argument)) {
        (void)fprintf(stderr, "unable to free arguments\n");
        exit (1);
    }
}
```

FIG. 4(c)

```
static const char   *rcsid  = "SId: SectClientController.C,v 1.4 92/04/29
14:47:59 francis Exp S";
/*
 * (c) Tandem Computers Incorporated 1991.
 *
 * The computer program listings and specification herein are
 * the property of Tandem Computers Incorporated and are not
 * to be reproduced or copied in whole or in part for any
 * reason without written permission of Tandem.
 */
#include <iostream.h>
#include <CCTandem/CCTandem.h>
#include <gifts/SectClientController.h>
#include <Oz/RpcClient.h>
#include <gifts/sect.h>
#include <CCTandem/Module.h>

//         Externs, statics & globals.

extern void joinObject(SharedThang *thang, RpcClient *host, const char
*baseName);
extern Feature sectFeature;
static Module thisModule(__FILE__, §Feature);

SectClientController::SectClientController(const char * _hostName)
  : hostName(_hostName)
{
static RpcHandle  sectHandles[] = {
#include "sectdClntHandles.h"
  0, NULLPROC };

if (! hostName)
    throw Exception(HERE, "SectClientController: No host specified.",
EvNoHostSpecified);

host = new RpcClient(hostName, SECT_PROG, SECT_VERS,
       sectHandles, RPCCLIENT_9RPCCLIENT_1);
  if(! host)
    throw Exception(HERE, hostName, EvConnectionFailed);
```

```
// Now, the daemon has created a control object and we want to
// attach this object to it.

joinObject(this, host, "SectController");
}

SectClientController::~SectClientController()
{
} void
joinObject(SharedThang *thang, RpcClient *host, const char
*baseName)
{
  const ClassInfo *rtype;
  int               i;

for (i=0; i < host->serverManifest.nthangs; i++) {
    rtype = &TYPEOF(host->translation(host->server
Manifest.types(i)
  );
    if (*rtype == TYPEOF(baseName)) {
      joinWithMaster(thang, JOIN_WITH_SLAVE_1, baseName,
host, host->serverManifest.ids(i), 0);
      if (thisModule.isDebug())
        cout << baseName << " object joined from daemon!
!" << endl;
      break;
    }
  }
  if (i == host->serverManifest.nthangs)
    throw Exception(HERE,
         form("Hey! daemon didn't make a %s object!",
baseName),
         EvNoDaemonObject);
} void
joinObject(SharedThang *thang, RpcClient *host,
         const char *baseName, unsigned mid)
```

FIG. 6(b)'

```
{
    const ClassInfo *rtype;
    int              i;
    for (i=0; 1 < host->serverManifest.nthangs; i++) {
        rtype = &TYPEOF(host->translation
(host->server Manifest.types(i))
    );

if (*rtype == TYPEOF(baseName)) {
            joinWithMaster(thang, JOIN_WITH_SLAVE_1,
baseName, host, mid, 0);
            break;
        }
    )
    if (i == host->serverManifest.nthangs)
        throw Exception(HERE,
            form("Hey! daemon didn't make a %s object!",
baseName),
            EvNoDaemonObject);
}
```

FIG. 6(b)"

```
SectController::SectController()
{
        if (thisModule isDebug())
                cout << "SectController::SectController called for  ject at"
                        << void*)this << endl;
}

SectController::~SectController()
{
} if      defined(SERVER)
void
SectController::startTester( nonly unsigned &id, const Twine& tid)
{ if (this Module.isDebug())
                cout << "SectController::startTester called...."   < tid << endl;

lastTester = SectTesterMaker::newSectTester(tid);
        id = (lastTester)? (unsigned)lastTester->id() : 0;
        if (thisModule.isDebug())
                cout << "Tester object <" << (void*)id << "  at address "
                        << (void*)lastTester << endl;

}
endif if      defined(OZ)
include        "clnt_SectController.C"
endif if      defined(SERVER)

include        "svc_SectController.C"
#endif
```

FIG. 8

```
// generated by oz Mon Jul 27 13:56:53 CDT 1992
#include <CCTandem/XdrBuffer.h>
#include <Oz/SharedThang.Id.h>
include <Oz/RpcClient.h> void
SectController::startTester(unsigned int& parm1, const Twine& parm2)
{
    XdrBuffer buffer;
    RemoteId& rid = (RemoteId &) masterId();
    u_long handle = rid.client→rwhich("SectController::start Tester(unsigned int&,const Twine&)");
    buffer << (u_int) rid.client→masterId() <<rid.id << parm1 << parm2;
    rid.client→execute(handle, buffer) >> parm1;
}
```

FIG. 9a

```
// generated by oz Mon Jul 27 13:56:53 CDT 1992
*include <CCTandem/XdrBuffer.h>
*include <Oz/SharedThangId.h>
*include <Oz/RpcClient.h>
*include <Oz/Thread.h>

// so as not to have to make the interface public
  extern "C" void start Tester__14SectControllerFRU1RC5Twine(SectController *,
unsigned int&,const Twine&);

extern "C" RpcArg*
  rstartTester__14SectControllerFRU1RC5Twine(RpcArg* args, CLIENT*)
  {
        XdrBuffer output;
        try {
              u_int id;
              RpcClient *twin;
              SectController *theSect Controller;
              XdrBuffer input (args->arg, args->len);

unsiged int parm1;
              Twine parm2;
              input >> id;
              twin = CAST(RpcClient *, SharedThang::get(id));
              input.set(&twin->translation);
              input >> id >> parm1 >> parm2;
              theSectController -> CAST(SectControler *, SharedThang::get(id));

startTester_14SectControllerFRU1RC5Twine(theSect Controller, parm1,
parm2);
              output << (int) LPC_SUCCESS << parm1;
        )
        catch (Exception &e) (
              output << (int) LPC_FAILED << e;
        )
        catch (Thread &t) (
              output << (int) LPC_PENDING;
        )
        return put(args, output);
  }
```

FIG. 9b

SectController::startTester(wonly unsigned &id, const Twine&);
SectTester::start(wonly int& status);
SectTester::stop(wonly int& status);
SectTester::putVar(wonly int& status, const Twine&, const Twine&);

FIG. 11

METHOD AND SYSTEM FOR IMPLEMENTING REMOTE PROCEDURE CALLS IN A DISTRIBUTED COMPUTER SYSTEM

CROSS-REFERENCE TO MICROFICHE APPENDICES A AND B

Appendices A and B, which are parts of the present disclosure, are microfiche appendices consisting of 2 sheets of microfiche each, having 124 frames and 121 frames respectively. Microfiche Appendices A and B are listings of computer programs and related data in one embodiment of this invention, which is described more completely below.

A portion of the disclosure of this patent document contains material which is subject to copyright protection. The copyright owner has no objection to the facsimile reproduction by anyone of the patent document, or the patent disclosure, as it appears in the Patent and Trademark Office files or records, but otherwise reserves all copyrights whatsoever.

BACKGROUND OF THE INVENTION

1. Field of the Invention

The present invention relates to distributed computer systems, and in particular, relates to the use of remote procedure call mechanisms in distributed computer systems.

2. Description of the Related Art

In a distributed computer system, efficiency can be enhanced by sharing of resources (e.g. a file system) among numerous computers in the system. In addition, multiple computers can be used cooperatively in such a system to perform a common task. A number of communication paradigms have been developed to structure a network of computers to allow these computers to work cooperatively or to share resources. Among these paradigms is the "client-server" model. In the client-server model, one or more computers (the "servers") are assigned to provide services which other computers (the "clients") in the distributed computer system may request, either by passing messages to the servers or by invoking remote procedure calls. In the client-server paradigm, the client initiates a service request, and the server responds to such service request.

A remote procedure call is a mechanism by which a program executing in a process space of one computer causes a procedure to be executed in a process space of another computer ("remote computer"). One implementation of the client-server paradigm has a client process invoke a remote procedure call to activate the requested service in a server process. A convenient implementation of the server process is a daemon process. A daemon process is a computer process which receives messages from other processes, and which, once started, is resident in the computer until a "kill" message is received from another process, a timer times out, or when the all expected messages are received. Such a daemon process is often used to manage a shared resource. For example, a daemon process for a print queue receives messages from processes which require the use of one or more printers associated with the print queue. To effectuate a print operation, a requesting process sends a print request to the daemon process which, if appropriate, would set up and schedule the necessary print processes to satisfy the print request. The daemon process provides efficiency, since tasks requiring printer-specific information are assigned to the daemon process and off-loaded from the requesting processes. A daemon process is said to be "sleeping" while waiting for a message from a requesting process, and is said to be "awaken" when performing its assigned task.

Modern software programs are designed to exploit the advantages of modularization and data abstraction. Modularization allows a complex system to be partitioned at defined functional interfaces into interrelated subsystems. Each subsystem's implementation complexity is thus shielded from ("transparent to") other subsystems, and can therefore be developed and modified to a large extent independently from other subsystems.

Data abstraction simplifies the task of programming by the use of high level data structures, which are logical or conceptual representation of the objects the data represent. Thus, data abstraction allows the programmer to manage data at a conceptual level, rather than managing data as a collection of primitive data types.

Ideally, suitable modularization should allow an application programmer to invoke services of the operating system, e.g. to request status of a print job, without knowledge of the intricacies as to how the service is procured or where the service provider is located. In addition, high level data structures support should be provided to allow an application program to interface with another program without dismantling the application program's high level data structure to lower level primitives.

Contrary to the goals of data abstraction and modularization, even though distributed computer systems have been used widely, remote procedure calls are implemented in language-dependent frameworks. Consequently, only relatively low level data structures can be passed between the computer processes involved in the remote procedure call, thereby requiring the application programmer to treat a distributed object specially. Such requirement defeats modularization.

Further, because a suitable mechanism for communicating high level data structures is unavailable, the data structure of an application program is often dismantled explicitly in the application program code to create the low level data structure necessary for communicating data across machine boundaries. The portability and reliability of such application programs are affected.

Thus, a mechanism of a high level of abstraction is desired to insulate application programs from having to set up for remote procedure calls. For example, remote procedure calls should be made transparent to the application programmer. That is, the mechanism should allow an application program to be written without knowledge or requirement that certain data structures of the application program are to be implemented on or be dependent upon resources controlled by a remote machine.

SUMMARY OF THE INVENTION

In accordance with the present invention, a remote procedure call structure and method supporting high level data structures are provided by the use of a common data structure or class ("base" class). By using the shared data structure to derive a distributed or shared object, a preprocessor can be built to automatically generate both client and server stub routines for a remote procedure call. An application program calling the server routines can pass to the server routine high level data in the same manner as passing the same data structure to a local routine.

In one embodiment of the present invention, the server is created as a daemon process at system initialization time. The server creates a remote procedure call server object ("RpcServer") which can accommodate one or more remote procedure call client objects ("RpcClients"). An RpcClient created in the client provides a communication channel between the RpcServer on the server and the client. In addition, an RpcClient is also created on the server to provide asynchronous communication between the server and the client.

When an RpeClient object is created in the client, a "manifest" is sent to the RpeServer, which responds by sending its own manifest to the RpeClient. A manifest contains class meta-information of each class in the corresponding server or client. Such class meta-information includes, for each class: (i) a "type code" identifying the class, (ii) the name of class, (iii) the number of base classes, (iv) the names of all the base classes, if any, from which the class is derived. In addition, for each shared object, the manifest also provides: (i) the type code of the shared object, and (ii) an index into a list of shared objects in the manifest sender's environment, such list containing, for each shared object, a pointer to the shared object.

A distributed or shared object is implemented by the combination of a master object ("master") implemented in the server and one or more slave objects ("slave") implemented in the client. Both the master and the slave are derived from the same common base class. To maintain correspondence between the master and each of its slaves, since the master and its slaves reside in different memory spaces, the master is provided a key to allow a remote procedure call to obtain a pointer to the slave in the slave's memory space, and each slave is provided a key to the master in the master's memory space. Thus, a remote procedure call can operate upon the remote object passing only a key to the remote object.

The present invention preserves local procedure call semantics by requiring the slave wait on the return of the remote procedure call. Local procedure call semantics are also preserved by an error handling mechanism which (i) traps exceptions in the server's memory space, (ii) passes the exception back to the client, and (iii) the client in turn passes the exception back to the appropriate level of software for handling. In the application program, the remote exception appears no different from an exception generated by a procedure executed locally.

In one embodiment, RpcClients are also created in the server to allow the server to communicate with a master object's slaves. In that embodiment, message daemons for broadcasting messages to the slaves are created by the server. Each slave provides to the master a key which can be presented to the client through the server's RpcClient for translation into a pointer to the slave. This pointer to the slave can be used to invoke a method for the slave to receive message from the message daemon.

Further, in accordance with the present invention, an automatic program generates both client and server stub routines for invoking a method in a distributed object.

Because the present invention provides support for distributed object in the context of a relatively high level data structure, such as a C++ class, and preserves local call semantics, distributed objects can be implemented in a manner transparent to the application programmer, thereby enhancing robustness and maintainability of the distributed objects. The present application simplifies application programs which are used to control a distributed computer system.

The present invention will be better understood upon consideration of the detailed description below and the accompanying drawings.

BRIEF DESCRIPTION OF THE DRAWINGS

FIGS. 1(1) and 1(2) ("FIG. 1") are two pages of a listing showing the declarations of the classes SharedThang, SharedThangId, and RemoteId in one embodiment of the present invention.

FIG. 3b is a listing of a script file chomp.cpp which extracts the _magic_ symbols a program GenType uses to provide an inheritance tree in accordance with the present invention.

FIG. 4b is a listing of the program segment Sectd.C, which is executed in server process Sectd of the present embodiment.

FIG. 4c is a listing of a routine SectdProg_1, which is called by RPC mechanism 204 to invoke a procedure in Sectd.

FIGS. 6a and FIG. 6b are respectively a block diagram of the program code which implements an object of the class SectClientController, and a listing of the program code.

FIG. 8 is the source code in file SectController.C for the actual implementation of the class SectController in Sectd.

FIGS. 9a and 9b are respectively the stub routine program segments SectController::startTester and rstartTester generated by the oz script upon the class StartTester, as illustrated in block diagrams of FIGS. 7a and 7b.

FIG. 11 is an example of a specification file for input into the oz script of FIG. 10.

Figure 2:
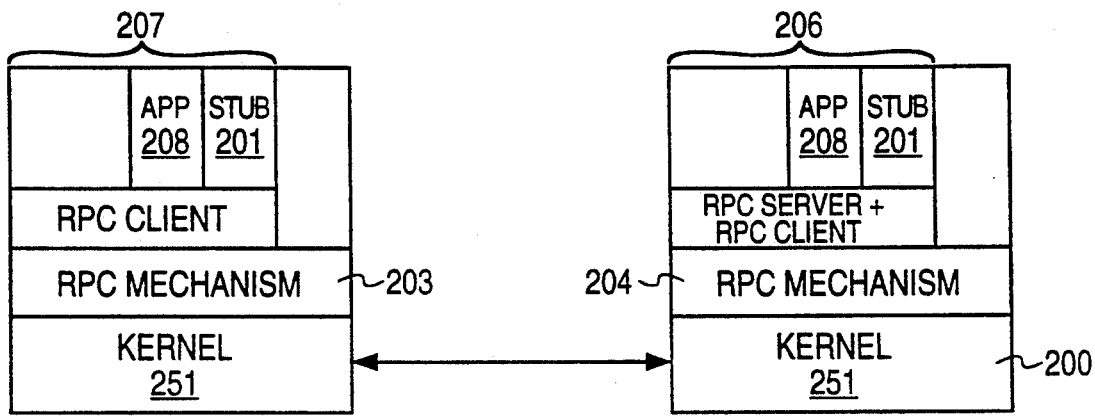
FIG. 2 is a block diagram showing the process spaces of a server process and a client process in one embodiment of the present invention.

Appendix C is a listing of the program GenType.

Appendix D is a listing of script file oz.

DETAILED DESCRIPTION OF THE PREFERRED EMBODIMENTS

In this detailed description, although the present invention can be implemented in any distributed computer systems using any programming language, an embodiment of the present invention using the programming language "C++" is described. The reader is referred to *An Annotated C++ Refernence Manual* by Ellis and Stroustrup, published by Addison and Wesley, (1990), hereby incorporated by reference in its entirety, for an explanation of the C++ programming language. In this embodiment also, a well-known text processing program "awk," which runs in the UNIX operating system, is used to generate program segments. The use of awk and other similar text processing programs are well-known to those skilled in the art. A description of awk can be found in Section 1 of *SunOS Reference Manual,* Release 4.1, (1990) available from Sun Microsystems, Moutain View, Calif. *SunOS Reference Manual* is also hereby incorporated by reference in its entirety.

In the following description and the accompanying drawings, names under the C++ programming language, which are involved in the names of overloaded functions and operators, are used interchangeably with their equivalent signature-encoded names of the C programming language ("mangled names") in accordance with the so called "name mangling rules." Those skilled in the art will appreciate the correspondence between mangled and unmangled names, so that a detailed description of name mangling is omitted. An explanation of the name mangling rules may also be found in *An Annotated C++ Reference Manual,* incorporated by reference in its entirety above.

The present invention is applicable to all distributed computer systems supporting remote procedure calls. One example of such a system is a computer network under NFS (network file system) available from Sun Microsystems, Mountain View, Calif. one application of the present invention can be found in the Gifts product from Tandem Computers, Inc. of Cupertino, Calif. Under Gifts, application programs are used to control, diagnose and configure hardware components of remote machines. In a fault tolerant environment, the present invention allows the Gifts product to control hardware, adding and removing components from service, and reconfiguring hardware without physical access and interruption of service.

In the following description, an "object" is a data structure typically comprising "attributes" and "methods." An attribute can be a data structure associated with the object. One example of such data structure is an array of values (e.g. integers), or a state variable useful in representing state information of the object. A method comprises one or more instructions useful in effectuating meaningful actions associated with the object. When implemented in a procedural programming language, a method is typically represented by either an operator or a procedure.

In addition, each object belongs to one or more classes. All objects within a class are alike in that each object possesses the same set of attributes and methods. Each class of objects can be used to define other classes of objects. A derived class inherits from a "parent" class the parent class's attributes and methods, and, in addition, includes attributes and methods defined for the derived class, or modified from the parent class. In this hierarchy, a class from which one or more other classes are derived is called a "base" class.

An embodiment of the present invention provides a base class SharedThang from which all distributed objects are to be derived. The class definition of SharedThang and its implementation are found in the files SharedThang.C and SharedThang.h of Appendix A.

The class SharedThang has attributes (i) stid, which is a pointer to an object of the class SharedThangId, and (ii) commonType, which is a pointer to an object of the class ClassInfo. The stid attribute points to a SharedThangId object ("SharedThangId"), which accesses a list of all shared objects ("shared object list") in the current process space. For each shared object, if the shared object is a master, its SharedThangId maintains a list of the shared object's slaves ("slaves"). Alternatively, if the shared object is a slave, SharedThangId keeps the identity of the shared object's master ("master").

A ClassInfo object has the attributes (i) type, which is a "type code" identifying the class ("instant class"), (ii) name, which is a character string identifying the instant class, (iii) nbases, which is the number of base classes, if any, from which the instant class inherits, (iv) bases, which is an array of pointers each pointing to an object of the class ClassInfo, each such object corresponding to one of the instant class's base classes and (v) xdr, which is a pointer to a routine provided for encoding or decoding an object of the instant class to and from a neutral data format suitable for transmission between computers by a data buffer of the class XdrBuffer.

In addition, the class ClassInfo includes the methods (i) CastDown, which can be used to exchange a pointer of an object for a pointer to another included object of a root class, (ii) typeof or get, which returns a ClassInfo structure corresponding to the instant class of an object, (iii) nameof, which returns the name of the instant object's class, and (iv) traverse, which visits every node in an inheritance tree (see below). The class definition of ClassInfo and its implementation are found in ClassInfo.h and ClassInfo.C included in Appendix B. In the present embodiment, an object of the class ClassInfo is created for (i) each supported data type (e.g. integers, real etc.), (ii) each class declared, and (iii) the pointer type associated with each declared class.

In SharedThangId, the slaves and the master are each represented by an object of the class RemoteId. Each RemoteId identifies the counterpart (or "twin") of a shared object in the remote environment. For example, a twin of a shared object in the server (i.e. a master) has a list slaves of RemoteId objects, each RemoteId object corresponding to one of the master's slaves. Conversely, a twin of a shared object in a client (i.e. a slave) has a RemoteId object master corresponding to the slave's master. Each RemoteId object comprises a pointer to an object of the class RpcClient, and an index into a shared object list of a SharedThangId. Since the server's and the client's SharedThangIds typically have different shared object lists, the same shared object has different indices in the client's and the server's shared object list. The RpcClient identifies a communication channel between a master and a slave, and is explained below in further detail.

FIG. 1 provides the declarations of the classes SharedThang, SharedThangId and RemoteId. Class SharedThang provides the methods: (i) id(), which returns the attribute stid, (ii) masterid(), which returns the RemoteId of the master of a SharedThang, and (iii) getCommonType(), which returns commonType, which is an object of the class ClassInfo. Class SharedThangId provides the methods addClient and addMaster, for adding to a master's list slaves a RemoteId corresponding to a slave, and for adding in the slave a RemoteId corresponding to the master, respectively.

In the present embodiment, a remote procedure call is performed by executing an RPC function execute passing to the rpc mechanism a "message" and a procedure number. The procedure number identifies the connection between the communicating programs, and the message is contained in a buffer ("message") of the class XdrBuffer. The definition and implementation of XdrBuffer are included in the files XdrBuffer.h and XdrBuffer.C listed in Appendix B. To encode in a message or to decode from a message an object derived from the class Thang (from which SharedThang derives), a method xdr in the ClassInfo object of the object's class is provided by the class implementer.

In a message of the present embodiment, an encoded object has the fields: (i) byte_count, which is the size in bytes of the encoded object, and (ii) a list of subrecords. Each subrecord has the fields: (i) type_tag, which is the type code of an included object, (ii) byte_count, which is the size in bytes of the subrecord, (iii) primitives, which is a list of primitive data structures, and (iv) a list of subrecords.

FIG. 2 illustrates in the process spaces of a server machine and a client machine in an embodiment of the present invention. In the server machine 200, an RPC mechanism 204 is a conventional application program which provides other application programs a remote procedure call interface to access the low level intermachine communication services in server machine 200's kernel 250. Analogously, Rpc mechanism 203 provides a conventional application program interface for other application programs to access the intermachine communication services of kernel 251. Typically, the header files of an Rpc mechanism, such as Rpc mechanisms 203 or 204, are compiled with an application program to provide a conventional program interface. Kernel 250 and 251 controls the underlying physical connection, e.g. a network or bus protocol, between the interconnected computers. In the present embodiment, the interconnected computers can be of very diverse architectures.

For each distributed object implemented in the present embodiment, a "master" of the distributed object is created in a server process, represented by server 206, to invoke the actual local procedure call. To access a method in the master object, it is necessary to exchange the key, which is an index into server 206's shared object list (i.e. the list of all SharedThangs in server 206), for a pointer to the master object in server 206's memory space. Since a pointer in the shared object list is a pointer to an included object (class SharedThang) of the master, if it is necessary to activate a member function of another included object (say, class foo, which is derived from class SharedThang) of the master, the pointer to SharedThang from the shared object list is required to be exchanged for a pointer to the included foo object. This process, which is called "down casting" is performed by class ClassInfo's member function CastDown. To implement CastDown, it is necessary to have the class derivation history of the classes of all shared objects. In the present embodiment, this derivation history is provided by using (i) a macro GIFTS_DECLARE to modify the declarations of each class of shared objects, (ii) to extract from the code generated by the preprocessor cpp a list of shared object classes, and (iii) providing such a list to a stand alone program GenType to generate code in the C language, which can be compiled to form a run-time inheritance tree.

Figure 3A:
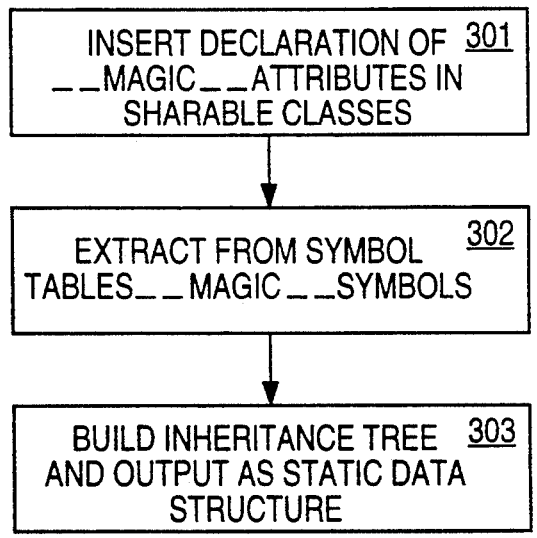
FIG. 3a is a block diagram showing the steps involved in creating an inheritance tree using a macro GIFTS_DECLARE and a program GenType.

This process is illustrated by the block diagram of FIG. 3a.

As shown in FIG. 3a, a macro GIFTS_DECLARE is provided at step 301 to insert into the declaration of every class ("instant class") derived from the class Thang the declarations of: (i) a member function _typeof(), (ii) a number of symbols, each symbol comprising the concatentation of the character string "_magic_" and the name of a base class from which the instant class derives, and (iii) a character string _nameof, which is assigned the name of the instant class. As a result of the macro GIFTS_DECLARE, the compilation of these additional declarations will include in the symbol table of each class a number of symbols prefixed with the character string "_magic_." These symbols are used in the present invention to encode the derivation possibilities of each class derived from the class Thang. The macro GIFTS_DECLARE is listed in macros.h, which is included in Appendix B.

At step 302, a "script" file chomp.cpp extracts, using a text processing utility egrep, from the symbol tables of compiled object files the inserted symbols which are prefixed with the character string "_magic_." These symbols are then provided to a stand-alone program GenType (step 303) running in UNIX from a command line interpreter or "shell". These symbols allow GenType to build an inheritance tree relating all classes of objects derived from Thang. Chomp.cpp is listed in FIG. 3b. The inheritance tree comprises (i) an array list, which is an array containing the ClassInfo structures corresponding to all classes, pointers to classes, and primitive data types supported; and (ii) for each class ("instant class") of shared objects, an array of pointers to ClassInfo, each element of the array pointing to a base class from which the instant class is derived.

GenType outputs the inheritance tree built in step 303 in C code, which is compiled to create the inheritance tree as a static data structure in each of the server and client address spaces. In addition, GenType also generates the code to implement the _typeof() member function for each class. The _typeof() function accesses the list data structure to retrieve the type code of an object. The source code for GenType is provided as GenType.C of Appendix C, which is hereby incorporated by reference in its entirety.

As discussed above, given a pointer to a Thang object included in a larger object, the purpose of ClassInfo's member function CastDown is to retrieve a pointer to either another included object of the larger object, or the larger object itself. The intended class for the down casting is provided to castdown by name. To obtain a pointer to the larger object, a function root is called to return the pointer "root" of the larger object. If the down casting is to an included object of the larger object, CastDown traverses the inheritance tree from the ClassInfo of "root," returned from ClassInfo's member function get, in an attempt to reach the intended class. If a class matching the name of the intended class is reached, CastDown computes a pointer to the larger object, using the offset between the destructor function and the this pointer in each intervening object of the derivation path. (In the programming language C++, each object is provided a pointer this, which points to the object itself). If the computed pointer to the larger object matches the pointer returned from root, the down casting is successful, and the pointer to the included object of the intended class is returned. Otherwise, the inheritance tree is further traversed for another inheritance path reaching the intended class. This procedure is required because the language C++ allows multiple inheritance paths.

Figure 4A:
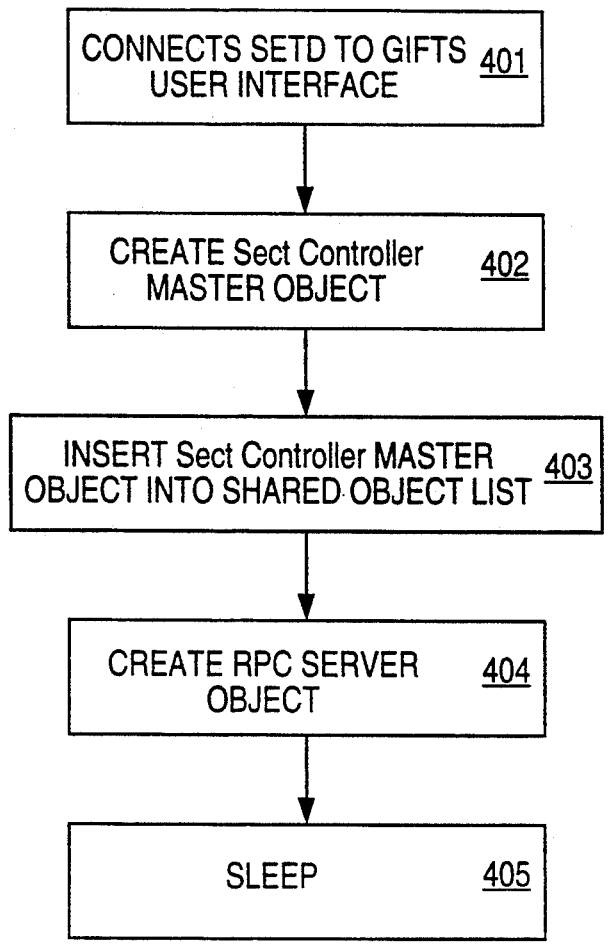
FIG. 4a is a block diagram illustrating a program which implements a daemon process Sectd.

Server 206 is normally implemented as a daemon. FIG. 4a is a block diagram of the program which implements a daemon Sectd (System Exercise and Confidence Test Daemon). Daemon Sectd houses a master object SectController. Sectd and SectController are respectively implemented by the program segments Sectd.C and SectController.C, which are listed in FIGS. 4b and 8. As shown in FIG. 4a, Sectd is started as an application program (i.e. server 206) using the Gifts user interface (step 401). Sectd then creates the master for the distributed object SectController (step 402) by calling the "server" side constructor routine. As shown in the program segment SectController.C of FIG. 8, a method startTester is the only method of the class SectController implemented in Sectd. In general, methods of a shared object are implemented only on the server side.

Figure 5:
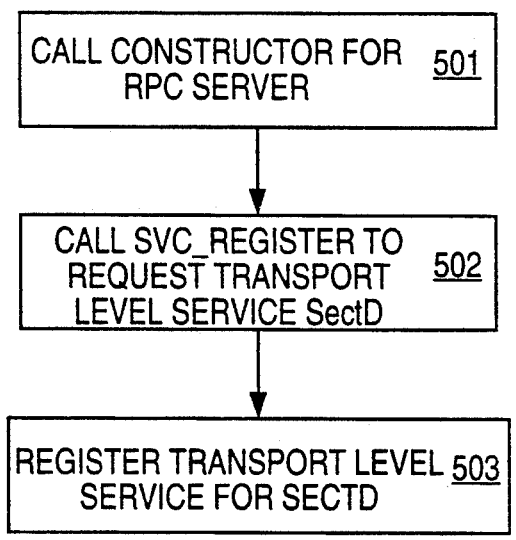
FIG. 5 is a block diagram illustrating the creation of an object of the class RpcServer, which is used to provide communication between the present embodiment's Sectd process and its clients.

The constructor routine (server side) for SectController returns a pointer for the SectController object created (step 403). To communicate with its clients, Sectd creates a communication server object RpcServer (step 404). RpcServer is used to filter communication between RPC mechanism 204 and Sectd. FIGS. 5 is a block diagram illustrating an implementation of an RpcServer. RpcServer is implemented by two program segments RpcServer.h and RpcServer.C listed in Appendix A. After creating the RpcServer, Sectd goes to sleep waiting for service requests from client objects, such as client 207 of client machine 251. The remote procedure call mechanism 204 calls a routine SectdProg_1, (listed in FIG. 4c), which invokes a routine in Sectd in accordance with a handle received from a client object.

As shown in FIG. 5, Sectd creates an RpcServer by calling, at step 501, the constructor routine of an RpcServer. This constructor routine (i) calls a system routine svc_register to create a transport level service for communicating between RPC mechanism 204 and Sectd (step 502), and (ii) registers the RpcServer in the network's register service (step 503). The network's register service provides a look-up service in the network for locating programs. The network's register receives a host machine name, the program's name, and a version, and returns a handle to the requested program. An entry in the network register service allows a remote program to access the RpcServer using the program number in a remote procedure call.

For each method of the distributed object, a stub routine is provided in Sectd and each of its clients, such as client 207. Thus, as shown in FIG. 2, to set up a remote procedure call for the method StartTester of SectController, "stub" routines 202 and 201 are provided to be executed in Sectd's and client 207's process spaces respectively. Stub routines 201 and 202 typically perform what are called "marshalling" and "unmarshalling" operations. Marshalling maps machine-dependent data structures from the formal parameters of the method call (e.g. pointer to an array) of one machine into a "neutral" data structure, which can be passed to the potentially different environment of another machine. Unmarshalling maps the neutral format interchanged between the environments into machine-dependent data structures. For example, when application program 205 calls client stub routine 201 with a list of arguments in machine-dependent data structures, client stub routine 201 performs the marshalling, and sends the marshalled arguments to RPC mechanism 203, usually in the form of an interprocess message. RPC mechanism 203, and its counter part RPC mechanism 204, requests from kernel 251 system services (e.g. ports and protocols) for communicating across machine boundaries. The marshalled arguments sent by RPC mechanism 203 are received by RPC mechanism 204, which in turn passes the marshalled arguments to Sectd. Sectd, which is a daemon process, calls stub routine 202 to unmarshall the received arguments. Stub routine 202 then passes the unmarshalled arguments to the local procedure 205 (e.g. "startTester_14SectController-FRUiRC5Twine" )[1], which implements the actual requested service of method StartTester. Results, if any, are returned from local procedure 205 to stub routine 202, which marshals the results for return to client 207. Return of results from Sectd to client 207 follows in reverse substantially the path of the marshalled arguments. Stub routine 201 unmarshals the result, which is then returned to application program 208. There is no limit on the number of clients, such as client 207, Sectd can service.

[1] The name of this program is an example of a mangled name. The first part of the name, which precedes the "_" is the C++ member function name, and the second part of the name, which follows the "_" is the signature portion. The signature portion encodes the parameter list to this member function. Mangled names allow implementation of "overloading" in the programming language C++ without modification to the C language. A C++ program is typically compiled by a C compiler, after a preprocessor cpp generates from the C++ program source code in the C programming language.

Figure 6A:
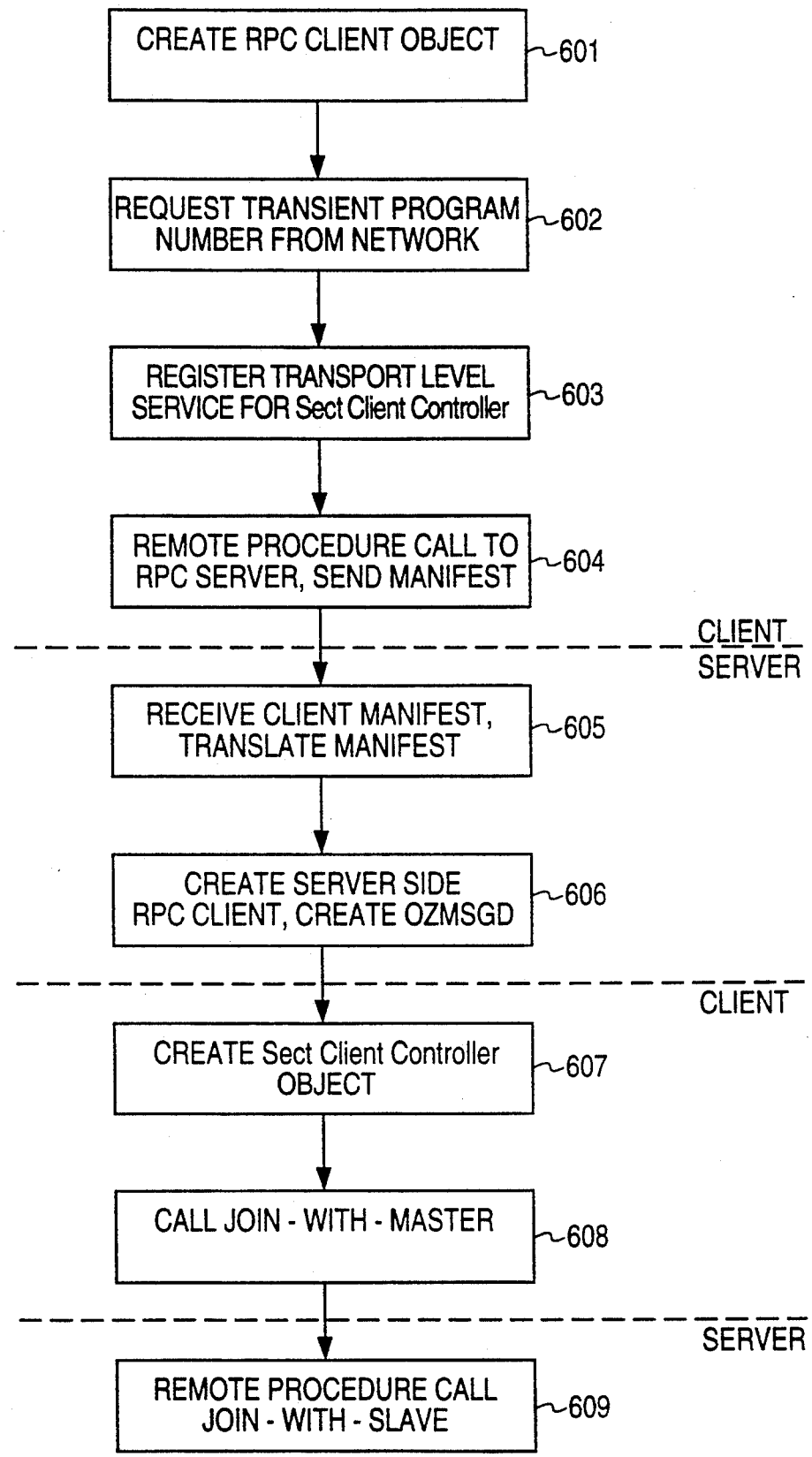

The program segment for SectClientController, which is listed in SectClientController.c of FIG. 6b and abstracted in the block diagram of FIG. 6a, is an example of a portion of a client process, such as client 207, which makes a remote procedure call.

Prior to making any remote procedure calls, SectClientController creates an object of the class RpcClient to form a communication channel between itself and Sectd (step 601). The class RpcClient is also derived from the class sharedthang. An implementation of the RpcClient object and related functions are found in the files, RpcClient.h, RpcClient.c, RpcUtil.h, RpcUtil.h, Wrapper.h and Wrapper.c included in microfiche Appendix A.

As shown in FIG. 6a, when SectClientController creates an RpcClient object, RpcClient's constructor routine (SectClientController's side) makes a request to system services to request a transient program number, which is presented with the version number to initiate a transport level service (step 602). This transport level service is used as a server in SectClientController for receiving messages from Sectd's RpcClient object, which is discussed below. (Sectd's RpcClients provide a path for communicating to Sectd's clients state information of master objects in Sectd, thereby forming a callback mechanism). Thus, with respect to messages received from Sectd, SeetClientController acts as a server. This transport level service is registered with the network register service to allow messages from Sectd to reach SectClientController (step 603). RpcClient's constructor routine then makes a remote procedure call (step 604) to a remote routine rct_9RpcClientFPCcUlUlR8ManifestU1PC9RpcHandlePC-7timeinte rval ("rct") in Sectd (through SectdProg_1, shown in FIG. 4c). The remote procedure call to rct sends Sectd (i) the transport level service's transient program number and version number, (ii) the host machine name of SectClientController, (iii) a "manifest"

(see below) of SectClientController (explained below) and (iv) the index of the RpcClient object in SectClientController's shared object list. In turn, remote procedure call to rct, which is implemented in the program segment in Wrapper.C of Appendix A, calls in step 605 the constructor routine (server side) for RcpClient to (i) translate the received manifest, (ii) and for the purpose of call-back, assigns as master of Sectd's RpcClient the index in Sectd's list of objects SectClientController's RpcClient. Sectd also creates a message daemon ozmsgd (step 606). The remote procedure call to rct returns a manifest including the information to all classes implemented in Sectd. Message daemon ozmsgd is intended as a facility to "call-back" the slaves of a master in Sectd, to notify the slaves of either (i) an asynchronous change of state in the master, (ii) the creation of a new shared object in Sectd, or (iii) the destruction of a shared object in Sectd.

In the conventional server-client model, a client requests service from a server by sending the server a message. The server then acknowledges or returns a result after the requested service is performed. In this conventional model, the server does not initiate communication with the client. However, in the present embodiment, because a master of a distributed object services one or more clients, it is sometimes necessary for the master of the distributed object to communicate asynchronusly a change in state of the master object. To this end, acting as a client in this instance, daemon ozmsgd calls SectClientController, and all similar clients of Sectd, to communicate the master object's change in state, and the creation or desctruction of a shared object, as discussed above.

In the present embodiment, a manifest contains, for each known class, class "meta-information." In order for slave and master objects to be properly matched, such meta-information includes, for each class, (i) a type code, which identifies the class, (ii) the name of the class, (iii) the number of base classes, if any, from which the class is dervied and (iv) the names of such base classes. In addition, a manifest contains, for each shared object in the process providing the manifest, a type code and the index of the shared object into the sending process's shared objects list. The manifest is built from the structure list, which is a portion of the inheritance tree created by GenType described above. The definition and implementation of the class manifest are provided in the files manifest.c and manifest.h included in Appendix B.

In the present embodiment, a system designer provides all system objects for the application programmer to use. Although these system objects may be distributed or local, the implementation is hidden from the application programmer. When SectClientController class is first instantiated, the constructor routine of the SectClientController locates the master SectController from a master's shared object list created from the manifest received from the SectController (step 607). As illustrated by this example, a connection between a master and the slave does not require that the master and the slave objects be of the same class. In this embodiment, compatibility is achieved since SectClientontroller is a class derived from SeetController. Thus, the same SectController in Sectd can be used to control a number of devices belonging to classes derived from the SectController class. To complete the connection, SectClientController requests a "join" with the master object SectController in Sectd by making a call to a function JoinWithMaster (step 608), passing to JoinWithMaster: (i) a pointer to SectClientController, (ii) a handle Join_With_Slave_1, representing an instruction to JoinWithMaster to call a routine JoinWithSlave, (iii) a pointer to SectClientController's RpcClient, (iv) the name of the base class "SectController," and (v) an index master into Sectd's shared object list, master corresponding to a SectController object in Sectd. Both JoinWithMaster and JoinWithSlave are listed in the program segments of files RpcUtil.h and RpcUtil.C included in Appendix A.

JoinWithMaster gets the ClassInfo object corresponding to class SectController. The ClassInfo object is returned by applying the typeof method on the name "SectController". The index master and the RpcClient are then associated by SharedThangId's member function addMaster with the SeetClientController object. Thereafter, a remote procedure call (step 609) using the handle Join_With_Slave_1 invokes through SectdProg_1 the function rjoinWithSlave_FP11SharedThangP9RpcClientUi ("rjoin") in Sectd to provide to Sectd SectClientController's index into SectClientController's shared object list.

The remote procedure call to rjoin passes to Sectd (i) the index master, identifying SectController in Sectd's list of SharedThangs, and (ii) the indices of RpcClient and SectClientController into SectClientController's shared object list. To match up with the corresponding RpcClient in Sectd, the index of RpcClient is exchanged for a pointer to the corresponding RpcClient's included object of the class SharedThang. This SharedThang pointer is in turn down casted to a pointer to the RpcClient object created by Sectd above. rjoin then calls the local routine JoinWithSlave to associate Sectd's SectController with the RemoteId formed by (i) the index of SectClientController passed and (ii) Sectd's corresponding RpcClient object. This RemoteId object is inserted in the SectController's slaves list, using the addclient member function of SharedThangId.

To ensure that the implementation is transparent to the application programmer, the present invention provides a mechanism which preserves for a remote procedure call "local procedure call semantics." With local procedure call semantics, the client process waits for the procedure call to return in the same manner as a procedure in the client process's memory space. Further, due to the difficulty of implementing language independent error handling mechanisms in a conventional remote procedure call, an error occurring in the remote environment is often not returned to the local environment. Instead, the calling procedure returns a time-out message after some time when the expected results are not received. However, local procedure call semantics can only be preserved when the error handling mechanism for remote procedure calls is also made indistinguishable from the error handling mechanism for local procedure calls.

In a conventional implementation of remote procedure calls, the client continues sequential execution in its process space until an explicit "wait" instruction is executed. Such implementation is undesirable because the application program is required to have both knowledge of a remote implementation and synchronization with a remote event.

Remote procedure calls can be effectuated by invoking in SectClientController a stub routine, such as stub routine 201, in the manner described with respect to FIG. 2. In this embodiment, stub routines 201 and 202 are generated simultaneously using a stub-routing generator implemented by a "script" file (the "oz" script). A script file is a program executable by an UNIX command line interpreter (called a "shell" in UNIX parlance).

Figure 7A:
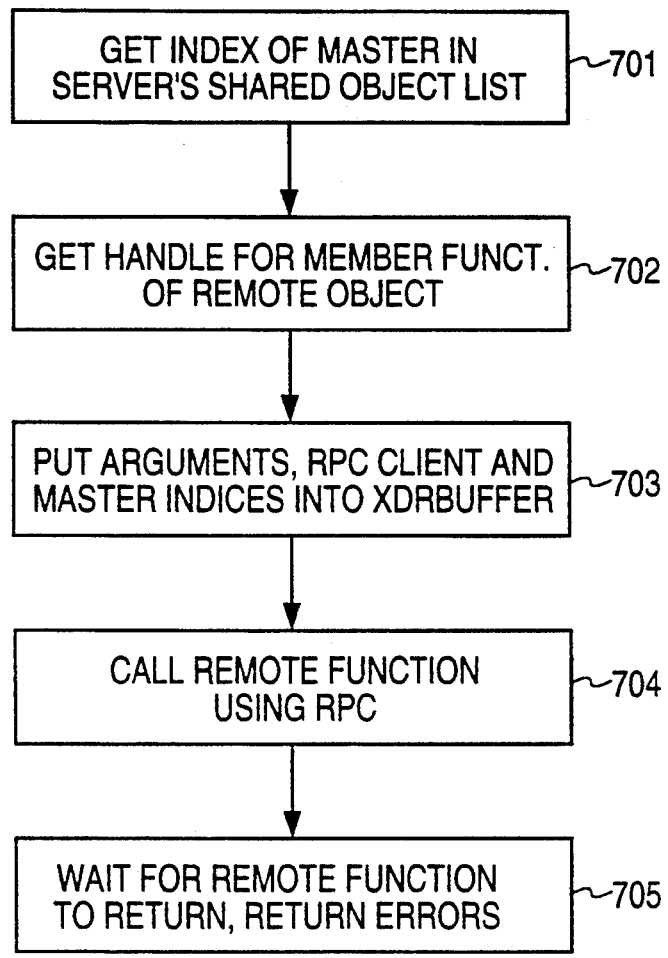
FIGS. 7a and 7b are respectively the block diagrams of stub routines SectController::startTester and rStartTester generated by the oz script for the master and slave objects, which implements in SectClientController and Sectd the distributed class SectController.
Figure 7B:
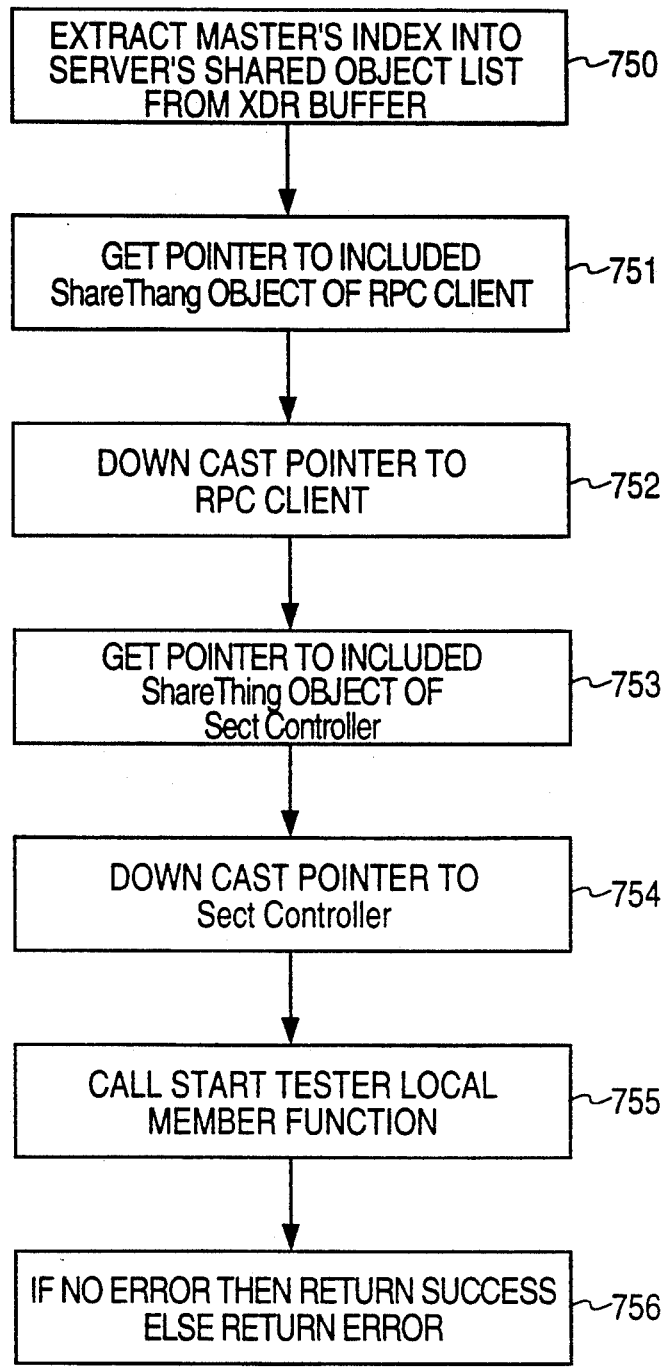

FIGS. 7a and 7b are respectively the block diagrams stub routines SectController::startTester and rstartTester_14SectControllerFRUiRC5TWine ("rstartTester") generated by the oz script for the master and slave objects, which implements in SectClientController and Sectd the distributed class SectController. FIG. 8 is the source code in file SectController.C for the actual implementation of the class SectController in Sectd, which has one member function SeetController::StartTester in addition to constructor and destructor functions. Since StartTester is to reside in Sectd, SectClientController's access to StartTester is through the stub routine generated by the oz script. The oz script generates two stub routines for SectController in files svc_SectController.C and clnt_SectController.C, for compilation with Sectd and SectClientController, respectively. For the purpose of compiling SectClientController, sectClientController.C includes the file clnt_SectController.C. For the purpose of compiling the server 206, SectController.C includes svc_Controller.C. Since the member function StartTester is actually implemented only in Sectd, the body of member function SectController::StartTester is included only for compilation in the Sectd. The stub routine generated by the oz script in Sectd is prepended by the character "r" to distinguish it from actual SectController::StartTester code. Hence, as shown in FIG. 8, the alternative compilation directive "#if defined(Server)" is used where inclusion in Sectd's version of SectController.C (i.e. svc_SectController) is desired, and the alternative compilation directive "#if defined(oz)" is used where inclusion in SectClientController's SectController.C (i.e SectController::startTester stub) is desired. As a result of compilation, an object file SectController.o is obtained for each version of SectController.C for binding with its respective client or server. Application programs binding with the client's version of SectController.o are not required to know that SectController is a distributed object.

As shown in FIG. 7a, SectController::startTester obtains the index masterid (i.e. the index into Sectd's shared object list) of SectController (step 701). The unsigned long integer handle which encodes the member function to call (i.e. rstarttester) is then retrieved (step 702) by the member function rwhich of RpeClient, mapping the name of the member function to the handle. The arguments to the member function parm1 and parm2, the address masterid of the master and the RpcClient object rid.id are then provided in a buffer structure of the class XdrBuffer, which is supported by the RPC mechanisms 203 and 204 (step 703). The buffer and the handle of the remote function are passed by the RPC mechanism to Sectd (step 704). FIG. 9a is the source code of the example stub routine of FIG. 7a generated by the oz script for SectClientController.

FIG. 7b is a block diagram example of the stub routine rStartTester generated by the oz script for Sectd of an object of the class SectController. As shown in FIG. 7b, the index of the master's RpcClient object into Sectd's shared object list is extracted from the message received from SectClientController (step 750). This index of the RpcClient object is then used to retrieve a pointer in Sectd's memory space to the RpcClient's SharedThang included object, using the SharedThang::get(id) member function (step 751). The pointer is then down cast to become a pointer to an object of the class RpcClient (step 752). The remaining parameters of the XdrBuffer are then used to obtain the index id of a SectController in Sectd's shared object list, and parameters parm1 and parm2 of the startTester (step 753). The index id is used to retrieve a pointer corresponding to SectController's included SharedThang object. This pointer is then down casted into a pointer to an object of the class SectController (step 754). rstartTester then calls the actual local procedure StartTester, as a member function of the class SectController (step 755). If no error occurred in the local procedure call the return value in variable parm1 and the error code LPC_Success is returned (step 756). Otherwise, exceptions are caught by one of two catch statements and the error code is returned. In this manner, an exception is passed back to the stub routine in SectClientController. Thus, the present invention preserves local call semantics in a remote procedure call. FIG. 9b is the source code of the example stub routine rstartTester of FIG. 7b generated by the oz script for Sectd.

Figure 10:
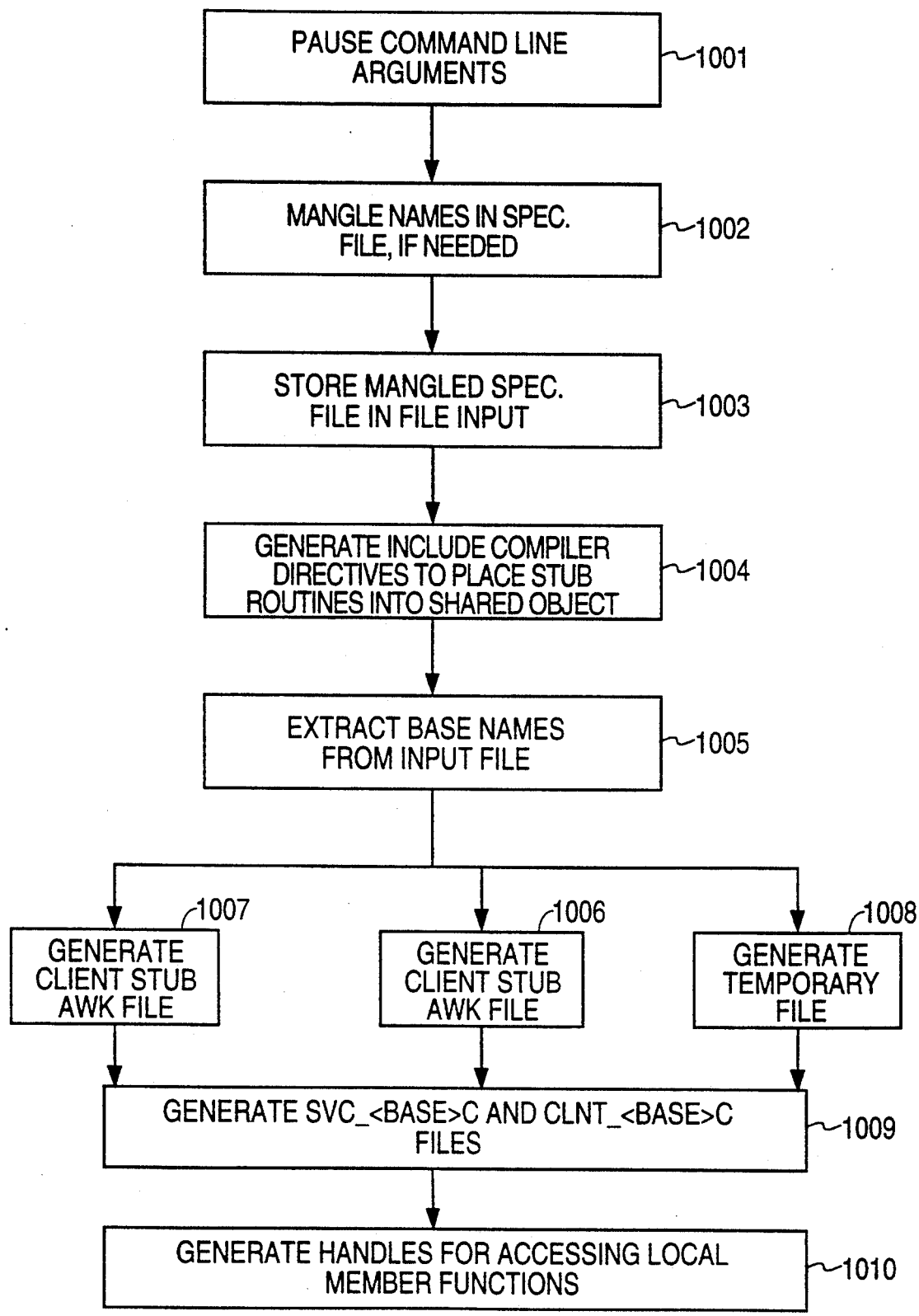
FIG. 10 is a block diagram illustrating a script file oz for generating stub routines for client and server processes, in accordance with the present invention.

FIG. 10 is a block diagram illustrating the operation of the oz script. Those skilled in the art will appreciate that many variations can be used to provide the stub routines. Such variations include but are not limited to the use of a program executable by other than a shell, or the use of other text processing utilities other than awk. The oz script of the present embodiment receives as input a specification file, and accepts optional command line arguments. These command line arguments specify (i) whether names in the specification file are required to be "unmangled" (-raw option); (ii) whether a client stub routine file is to be generated (-c option); (iii) whether a server stub routine file is to be generated (-s option); (iv) whether the compiler directives for alternative inclusion of the server or client stub routine files should be appended to the body of the .C file implementing the distributed object (-m option); and (v) whether handles to the remote functions, e.g rstartTester, should be generated for inclusion to the program, e.g. SectProg_1, called by the RPC mechanism on the server side (-h option).

FIG. 11 is the content of a specification file used by the oz script to generate the stub routines for SectController illustrated in FIGS. 7a and 7b. To illustrate the generation of the stub routines discussed above, consideration of the first line in the specification file suffices.

As shown in FIG. 10, oz script parses the command line and extracts from the command line arguments for setting the internal states of the oz script (step 1001). According to whether the -raw option is set, name mangling operations are performed on the specification file (step 1002). Mangling translates the name of a C++ function into a unique name, which includes an encoding of the function's parameter list. The results of name mangling the specification file are stored in a new file input (the "input" file). In this embodiment, another shell script "mangle" was used to perform name mangling. However, other shell scripts which conform substantially with the name mangling rules set forth in the reference above are equally applicable. If the -raw option is not set, the specification file is copied into the input file (step 1003) directly, bypassing the name mangling step. In addition, if the -m option is set, alternative compilation directives are added to the source code file of the distributed class (step 1004). The input file is then parsed to extract from the unmangled names a list of the base classes represented in the input file (step 1005). For example, in the input file derived from the specification file of FIG. 11, two base classes "SectTester" and "SectController" are extracted from the input file. The extracted list of base classes are included into a "baselist" file.

Awk command files svc.awk and clnt.awk are prepared in the next steps 1006 and 1007. Command file svc.awk (i) provides the necessary header file interfaces to the remote procedure call facility and declaration of other data structures, such as SharedThangId, (ii) examines an input temporary file for a member function call, (iii) provides in the server object unmarshalling instructions for passing input type parameters to actual implementations of the distributed object and (iv) provides marshalling instructions for returning values of parameters of other input/output types. Command file svc.awk also provides an instruction in the output server object for downcasting a SharedThang object to the base class specified in the input temporary file.

Command file clnt.awk also provides interfaces to the remote procedure call facility, and declaration of data structures. In additional, clnt.awk marshals input type parameters to create a remote procedure call using the input parameters, and provide unmarshalling instructions for output or bidirectional parameters which values are returned from the remote procedure call.

At step 1008, the baselist file is used to extract, for each base class, member function calls from the input file to be placed into an output temporary file. This temporary file is then used at step 1009 by both command files clnt.awk and svc.awk to generate the output stub routine files svc_<base>.C and clnt_<base>.C (where <base> is the name of the base class, e.g. SectController above).

At step 1010, the member functions of the class SectController are encoded into handles to be included in a file SectdProg.c. SectdProg.c includes a Sectd function SectProg_1 which calls via a switch statement functions in Sectd, in accordance with the handle provided to the RPC mechanism.

Appendix D provides the source listing of the oz script described in block diagram form in FIG. 10.

The above description illustrates specific embodiments of the present invention and does not limit the present invention. Numerous modifications and variations are possible within the scope of the present invention. For example, although the detailed description provided above uses as an example an implementation in the C++ programming language, the present invention is applicable to any object oriented programming language. The present invention is set forth by the following claims.

```
static char rcsid[] =
      "$Id: gentype.C,v 1.12 92/04/01 19:46:24 tjd Exp $";
#include <iostream.h>
#include <stdio.h>
#include <stdarg.h>
#include <string.h>
#include <unistd.h>
#include <stdlib.h>
include <ctype.h> define EXTERN "extern"

ifndef BUFSIZ                        // not defined in S2's /usr/include/CC/stdio.h!!
#define BUFSIZ 1024
endif int maxline = 1024;
int dowarn = 0;
const int NDERIVE = 1;   // right now, a ClassInfo for a class and class ptr
int NKID = 32;
char *SYMBOL="__11RootClasses";
char **magic;
const char *progname = "a.out";

#define TRUE 1
#define FALSE 0
#define NOOP
#define ASIZE(a) (sizeof(a) / sizeof(a[0]))
#define form _form
#define EOS '\0'
#define self (*this)
typedef char Buffer[BUFSIZ];

enum Stage { INIT, ORIENT, DERIVE, DUMP };

static const char *star[NDERIVE] = { "*" };

static struct SimpleClass {
        const char* name;
        const char* mangled;
        const char* symbol;
        int size;
        const char* xdr;
```

```
} predefined[] = {
        "unsigned char", "RCUc", "%uc", sizeof(unsigned char), "xdr_u_char",
        "char", "RCc", "%c", sizeof(char), "xdr_char",
        "char*", "PCc", "%s", sizeof(char*), "xdr_string",
        "unsigned short", "RCUs", "%uh", sizeof(unsigned short), "xdr_u_short",
        "short", "RCs", "%h", sizeof(short), "xdr_short",
        "short*", "PCs", "%x", sizeof(short*), "0",
        "unsigned int", "RCUi", "%ud", sizeof(unsigned int), "xdr_u_int",
        "int", "RCi", "%d", sizeof(int), "xdr_int",
        "int*", "PCi", "%x", sizeof(int*), "0",
        "unsigned long", "RCUl", "%ul", sizeof(unsigned long), "xdr_u_long",
        "long", "RCl", "%ld", sizeof(long), "xdr_long",
        "long*", "PCl", "%x", sizeof(long*), "0",
        "float", "RCf", "%f", sizeof(float), "xdr_float",
        "float*", "PCf", "%x", sizeof(float*), "0",
        "double", "RCd", "%lf", sizeof(double), "xdr_double",
        "double*", "PCd", "%x", sizeof(double*), "0",
};

void fatal(const char*, ...);

class SuperClass {
public:
        SuperClass(int, const char*);
        SuperClass();
        virtual ~SuperClass();
        char *mangled;
        char *demangled;
        char *prototype;
        char *symbol;
        char *name;
        const char *xdr;
        int  size;
        int  nameLength;
        const char *input;
        int nparent;
        SuperClass **parent;
        int nkid;
        int maxkid;
        SuperClass **kid;
        SuperClass *derivatives[NDERIVE];
        Stage stage;
        int ndx;
        void load(char*);
        void load(SimpleClass&);
        void derive(int, SuperClass&);
        SuperClass *derive(SuperClass*);
        void orient(SuperClass* = 0);
        void dump();
        static SuperClass *root;
        static int count;
        SuperClass& do_magic();
        SuperClass& do_typeof();
        SuperClass& do_parents();
} *classes;

SuperClass**
grow(int& size, SuperClass **array)
{
#if defined(FIX)
        int old = size;
        SuperClass **glob = array;
        array = new SuperClass*[size *= 2];
        memcpy(array, glob, old * sizeof(SuperClass*));
        delete glob;
        return array;
#else
        fatal("rerun with -nkid #, where # > %d", size);
        return 0;
#endif
} char**
grow(int& size, char **array)
```

```
{
        int old = size;
        char **glob = array;
        array = new char*[size *= 2];
        memcpy(array, glob, old * sizeof(char*));
        delete glob;
        return array;
} char*
strndup(const char *s, int n)
{
        char *t = new char[n + 1];
        strncpy(t, s, n);
        t[n] = EOS;
        return t;
}

// the root
SuperClass::SuperClass(int n, const char *bigMugambo)
{
        ndx = count++;
        mangled = name = new char[BUFSIZ];
        strcpy(name, bigMugambo);
        nameLength = strlen(name);
        symbol = name + nameLength + 1;
        sprintf(symbol, "%%<%s>", name);
        xdr = "0";
        input = "";
        parent = kid = 0;
        nparent = nkid = size = 0;
        memset(derivatives, 0, sizeof(derivatives));
        stage = ORIENT;
        root = this;
        kid = new SuperClass*[maxkid = n];
}

// all SuperClasses except the root
SuperClass::SuperClass()
{
        ndx = count++;
        mangled = demangled = name = symbol = 0;
        xdr = "0";
        input = "";
        parent = kid = 0;
        nparent = nkid = size = 0;
        memset(derivatives, 0, sizeof(derivatives));
        stage = INIT;
        kid = new SuperClass*[maxkid = NKID];
}

SuperClass *SuperClass::root = 0;

SuperClass::~SuperClass()
{
        if (mangled) delete mangled;
} void
SuperClass::load(char *s)
{
        int nest = 0;

input = s;
        mangled = strdup(s);
        strtok(mangled, " \t");
        name = strtok(0, ":");
        nameLength = strlen(name);
        symbol = new char[nameLength + 4];
        sprintf(symbol, "%%<%s>", name);
        demangled = strtok(0, "(") + 1;
        prototype = demangled + strlen(demangled) + 1;
        *strrchr(prototype, ')') = EOS;
}
```

```
void SuperClass::load(SimpleClass& stuff)
{
        int n = strlen(stuff.name) + strlen(stuff.symbol) + 3;
        mangled = name = new char[n];
        strcpy(name, stuff.name);
        nameLength = strlen(name);
        symbol = name + nameLength + 1;
        strcpy(symbol, stuff.symbol);
        xdr = stuff.xdr;
        size = stuff.size;
        nparent = 0;
} void SuperClass::derive(int n, SuperClass& base)
{
        int nalloc = strlen(base.name) * 3 + 10;        // uh, a whole bunch base.derivatives[n] = this;
        mangled = name = new char[nalloc];
        sprintf(name, "%s%s", base.name, star[n]);
        nameLength = strlen(name);
        symbol = name + nameLength + 1;
        strcpy(symbol, base.symbol);
        strcpy(symbol + strlen(symbol) - 1, star[n]);
        strcat(symbol, ">");
        size = sizeof(void*);
        /*
                This is weird, so hold on.  To do equivalence testing between objects, consider the following class declarations:

class A { ... };
                class B : public A { ... };

A a; B b; A *ap = &a; B *bp = &b;

The following code is cool...

b = a;
                ap = bp;

But this isn't...

a = b;
                bp = ap;

So as to keep the expression (typeof(lhs) == typeof(rhs)) working properly, the parent-child relationship for pointers to objects
                is back-asswards from normal objects.
        */
        if (nparent = base.nkid) parent = new SuperClass*[nparent];
} ifdef mips
define VSPRINTF(b, f, ap) vsprintf(b, (char*)f, ap)
#else
#define VSPRINTF vsprintf
endif const char*
_form(const char *format ...)
{
        static Buffer buffer;
        va_list ap;
        va_start(ap, format);
        VSPRINTF(buffer, format, ap);
        va_end(ap);
        return buffer;
} const char*
vform(const char *format, va_list ap)
```

```
{
        static Buffer buffer;
        VSPRINTF(buffer, format, ap);
        return buffer;
} ostream&
operator<<(ostream& os, SuperClass& node)
{
        os << form("%5d,%d,%d,\"%s\",%s,0,0,%d,", node.ndx,
                node.size, node.size = 0, node.name, node.xdr, node.nparent);
        if (node.nparent) os << form("__p%d,0,0,0,~0", node.ndx);
        else os << "0,0,0,0,~0";
        return os;
} void fatal(const char* format ...)
{
        va_list ap;
        va_start(ap, format);
        cerr << progname << ": error: " << vform(format, ap) << endl;
        va_end(ap);
        exit(1);
} void warning(const char *format ...)
{
        if (!dowarn) return;

va_list ap;
        va_start(ap, format);
        cerr << progname << ": warning: " << vform(format, ap) << endl;
        va_end(ap);
} ostream&
operator<<(ostream& os, const char *sarray[])
{
        while (*sarray) os << *sarray++ << endl;
        return os;
} const char*
strlook(register const char *s, register const char *term)
{
        while (*s && !strchr(term, *s)) s++;
        return (*s) ? s : 0;
} int
ntoken(const char *s, int separator)
{
        int n = 1;
        char *p = strchr(s, separator);
        while (p) {
                n++;
                p = strchr(p + 1, separator);
        }
        return n;
} void
SuperClass::orient(SuperClass *child)
{
        SuperClass *node;
        int i, len;
        char ch;
        char *p, *q;

if (child) {
                if (nkid >= maxkid) kid = grow(maxkid, kid);
                kid[nkid++] = child;
```

```
        } if (stage == ORIENT) return;

stage = ORIENT;
        p = prototype;
        nparent = ntoken(p, ',');
        parent = new SuperClass*[nparent];

for (i = 0; i < nparent; i++) {
                q = strchr(p, ',');
                len = (q) ? q - p - 1 : strlen(p) - 1;

if (strncmp(p, root->name, len)) {
                        ch = p[len];
                        p[len] = EOS;
                        for (node = classes; *node->input; node++)
                                if (!strcmp(node->name, p)) break;
                        if (!*node->input) fatal("parent class \"%s\" not found"
, p);

p[len] = ch;
                        node->orient(this);
                        parent[i] = node;
                }
                else {
                        root->orient(this);
                        parent[i] = root;
                } p = q + 1;
        }
} const int MAXBASE = 10;

SuperClass&
SuperClass::do_magic()
{
        cout << form("const char *__nameof%s_%d%s = \"%s\";\n",
                name, nameLength, name, name);
        cout << form("\nvoid %s() { }", mangled) << endl;
        // cout << form("extern MF __vtbl__%d%s[];", nameLength, name) << endl;
        return self;
}

SuperClass&
SuperClass::do_typeof()
{
        if (size) {
                const char *s = strchr(name, '*');
                int ninc = 0;
                cout << "int __typeof__F";
                while (*s) {
                        cout.put('P');
                        s++;
                        ninc++;
                }
                cout << "C" << nameLength - ninc;
                s = name;
                while (*s != '*') cout.put(*s++);
                cout << "() { return list" << SYMBOL << "[" << ndx << "].type; }
";
        }
        else
                cout << form("int __typeof__%d%sCFv() { return list%s[%d].type;
}",
                        nameLength, name, SYMBOL, ndx);
        cout << endl;
        return self;
}

/*
        A copy constructor will take at least 2 pointers/references; the
        first is the "this" pointer, which will be 0 for an object in heap;
```

```
        the last, a reference to an object to copy.  If we laid down a
        copy constructor definition, then we will have generated a static
        "clone" member function, which takes just the last pointer.  If
        there is no copy constructor, then just generate the static here,
        making it return 0.
*/ void
do_clone(const char* s)
{
        static char name[128];
        int n;
        s += 8;
        n = 0;
        while (isdigit(*s)) n = n * 10 + (*s++ - '0');
        if (!n) return;

strncpy(name, s, n);
        name[n] = EOS;
        warning("no copy constructor defined for class %s", name);
        cout << form("\nstruct %s;", name);
        cout << form("\nstruct %s *_clone__%d%sSFPC%d%s()", name, n, name, n, name);
        cout << form("\n{\n\tnoCopy(\"%s\"); return 0;\n}", name) << endl;
}

SuperClass*
SuperClass::derive(SuperClass *list)
{
        int i, j;

if (stage == DERIVE) return list;
        stage = DERIVE;
        for (i = 0; i < nkid; i++) list = kid[i]->derive(list);
        for (i = 0; i < NDERIVE; i++) list[i].derive(i, self);
        for (i = 0; i < nkid; i++)
                for (j = 0; j < NDERIVE; j++)
                        list[j].parent[i] = kid[i]->derivatives[j];

//for (i = 0; i < nkid; i++)
        for (i = 0; i < NDERIVE; i++)
                list[i].do_parents();

return list + NDERIVE;
}

SuperClass&
SuperClass::do_parents()
{
        if (!nparent) return *this;
        cout << form("\nstatic ClassInfo *__p%d[] = { /* %s */\n", ndx, name);
        for (int i = 0; i < nparent; i++)
                cout << "\t&list" << SYMBOL << "[" << parent[i]->ndx << "],\t/* "
                        << parent[i]->name << " */\n";
        cout << "\t0\n};" << endl;
        return *this;
} void
SuperClass::dump()
{
        if (stage == DUMP) return;
        stage = DUMP;

if (this != root) {
                do_magic();
                do_typeof();
                do_parents();
        } for (int i = 0; i < nkid; i++) kid[i]->dump();
}
```

```
void
dump(int i, SimpleClass& node)
{
        cout << form("int __typeof__F%s() { return list%s[%d].type; }",
                node.mangled, SYMBOL, i) << endl;
} static int
compare(const void* i, const void* j)
{
        return (int)strcmp(classes[*(int*)i].name, classes[*(int*)j].name);
} char*
stradd(const char *s, const char *t)
{
        char *temp = new char[strlen(s) + strlen(t) + 2];
        sprintf(temp, "%s %s", s, t);
        return temp;
} const char*
dem(const char *s)
{
        static Buffer buffer;

register char *p = buffer;
        register const char *q = s;

while (!isdigit(*q)) q++;
        int funcLen = q - s - 2;
        int nameLen = 0;
        while (isdigit(*q)) nameLen = nameLen * 10 + (*q++ - '0');
        strncpy(p, q, nameLen);
        p += nameLen;
        strcpy(p, "::");
        p += 2;
        strncat(p, s, funcLen);
        p += funcLen;
        *p++ = '(';
        if (strncmp(q += nameLen, "SF", 2)) fatal("can't demangle \"%s\"", s);
        q += 2;

/*
                now, we've got the class name; let's get the names of the
                derived-from classes...
        */
        while (*q++ == 'P') {
                nameLen = 0;
                while (isdigit(*q)) nameLen = nameLen * 10 + (*q++ - '0');
                while (nameLen) {
                        *p++ = *q++;
                        nameLen--;
                }
                *p++ = '*';
                if (*q == 'P') *p++ = ',';
        }
        *p++ = ')';
        *p = EOS;
        return buffer;
} main(int argc, char *argv[])
{
        Buffer buffer;
        int i, n;
        int total;
        int nmagic;

static char *declaration[] = {
                "#include <CCTandem/ClassInfo.h>",
                0
        };
```

```
        progname = argv[0];
        for (i = 1; i < argc; i++) {
                if (!strcmp(argv[i], "+w")) dowarn = 1;
                else if (!strcmp(argv[i], "-nkid")) NKID = atoi(argv[++i]);
                else if (!strcmp(argv[i], "-sym")) SYMBOL = argv[++i];
                else fatal("usage: %s [+w] [-nkid #]", progname);
        }
        magic = new char*[maxline];
        n = 0;

cout << declaration;
        cout << "ClassInfo list" << SYMBOL << "[];" << endl;
        while (cin.getline(buffer, sizeof(buffer)) && *buffer) {
                if (n >= maxline) magic = grow(maxline, magic);
                if (!strncmp(buffer, "__magic__", 9))
                        magic[n++] = stradd(buffer, dem(buffer));
        } if (!n) return 0;

nmagic = n * (NDERIVE + 1);
        SuperClass root(256, "Thang");
        total = nmagic + ASIZE(predefined) + NDERIVE;
        classes = new SuperClass[total];
        for (i = 0; i < n; i++) classes[i].load(magic[i]);
        for (i = 0; i < n; i++) classes[i].orient();
        SuperClass::root->derive(classes + n);

SuperClass::root->dump();
        for (i = n; i < nmagic + NDERIVE; i++) classes[i].do_typeof();
        n = total - ASIZE(predefined);
        for (i = n; i < total; i++) {
                classes[i].load(predefined[i - n]);
                dump(i + 1, predefined[i - n]);
        } cout << "\nClassInfo list" << SYMBOL << "[] = {" << endl;
        cout << *SuperClass::root << ", " << endl;
        for (i = 0; i < total; i++) {
                cout << classes[i] << ", " << endl;
        }
        cout << "};\nint listCount" << SYMBOL << " = " << total+1 << ";" << endl
;

exit(0);
        }
```

---

```
/* */#!/bin/sh
/* */#
/* */# $Id: oz.cpp.v 1.8 92/04/28 18:08:42 franci$ Exp $
/* */#
export CPP
CPP=${CPP-/lib/cpp}
MANGLE=${MANGLE-MANGLECMD}
AWK=awk
EGREP=egrep
TMPDIR=${TMPDIR-/tmp}
OZDIR=$TMPDIR/oz$$
verbose=1
me=  basename $0
usage='
    echo "usage: $me [-scmq] [-hname[+offset]][-raw]"
    rm -rf $OZDIR
    exit 2

NUKE () { if [ $verbose -ne 0 ]; then
        if [ -r $1 ]; then
            echo rebuilding $1
        else
            echo creating $1
        fi
    fi
```

-continued

```
        rm -f $1
doMangle=1
doClient=0
doServer=0
doHandles=0
doModify=0
for A do
    case $A in
    -raw) doMangle=0;
        ;;
    -h*) doHandles=1;
            handleBase= expr $A :  -h  ([  +]*  .*   ;
            handleOffset=  echo $A | cut -d+ -f2   ;
            (test   echo $handleOffset | cut -c1  = "-") && handleOffset=0;
        ;;
    -*) rest=  echo $A | cut -c2=';
            while test "$rest" !=" "; do
                case $rest in
                    m*) doModifty=1;
                        ;;
                    s*) doServer=1;
                        ;;
                    c*) doClient=1;
                        ;;
                    q*) quiet=1;
                        ;;
                    *) eval $usage
                        ;;
                esac
                rest=  echo $rest | cut -c2=  ;
            done
        ;;
    *) eval $usage
        ;;
    esac
done
if test "$doModify" -eq 0 -a "$doServer" -eq 0 -a "$doClient" -aq 0
    -a "$doHandles" -eq 0; then
    eval $usage
fi
rm -rf $TMPDIR/oz*
mkdiz $OZDIR
trap "rm -rf $OZDIR; exit" 1 2 3 15
if test $doMangle -ne 0; then
    $MANGLE | paste -s -d'# n' - |
        $AWK -F'; { printf("%s.C#%s  n", $1, $0); }' > $OZDIR/input
else
    cat > $OZDIR/input
fi
cat > $OZDIR/modify <<@EOF
#if defined(SERVER)
#   include "svc_#FILE#.C"
#elif defined (OZ)
#   include "clnt_#FILE#.C"
#endif
@EOF
touch $OZDIR/baseList
prev=
$AWK -F# '{ print $1 }' $OZDIR/input | while read sourceName; do
    base= 'expr "$sourceName" :   (.*  .|  .|*'   ;
    (test "$base" - "$prev") && continue;
    if test $doModify -ne 0; then
        (test $verbose -ne 0) && echo modifying $sourceName;
        sed "s/#FILE#/$base/g" $OZDIR/modify >> $sourceName;
    fi
    prev=$base;
    echo "$base" >> $OZDIR/baseList
done
cat > $OZDIR/svc.awk <<'@EOF'
BEGIN {
    printf("#include <CCTandem/XdrBuffer.h>  n");
    printf("#include <Oz/SharedThangId.h>  n");
    printf("#include <Oz/RpcClient.h>  n");
    printf("#include <Oz/Thread.h>  n");
}

{
    end=index($2, "; ;");
    class=substr($2, 1, end - 1);
    rstart=index($2, "(");
    for (j = length($2); j >= 1; j--)
        if (substr($2, j, 1) == ")") break;
```

```
            rlength=j — rstart + 1;
        if (index(substr($2, j, 100), "const") > 0)
                constModifier = "const ";
        else
                constModifier = " ";
        call=substr($2, end + 2, rstart — end — 2);
        args=substr($2, rstart+1, rlength—2);
        if (args == "void") {
                nformals = 0;
        }
        else {
                nformals=split(args, formals, ",");
        }
        printf(" n// so as not to have to make the interface public  n");
        printf("extern   "C  " void %s", $3);
        if (nformals == 0)
                printf("(%s%s *);   n", constModifier, class);
        else
                printf("(%s%s *, %s);  n", constModifier, class, args);
        printf("  nextern   "C  " RpcArg*  n");
        printf("r%s(RpcArg* args, CLIENT*)  n", $3);
        printf("{  n   tXdrBuffer output;  n");
        printf("  ttry {  n");
        printf("  t   tu_int id;   n");
        printf("  t   tRpcClient *twin;  n");
        printf("  t   t%s *the%s;  n", class, class);
        printf("  t   tXdrBuffer input (args—<arg, args—>len);   n   n");
        for (i = 1; i <= nformals; i++) {
                reference = index(formals[i], "&"};
                if (substr(formals[i], 1, 4) == "but ") {
                        direction[i] = "out";
                        var_type[i] = formals[i];
                }
                else if (substr(formals[i], 1, 6) == "const ") {
                        direction[i]= " in";
                        var_type[i] = substr(formals[i], 7, 100);
                }
                else if (reference == 0) {
                        direction[i] = "in";
                        var_type[i] = formals[i];
                }
                else {
                        direction[i] = "both";
                        var_type[i] = formals[i];
                }
                printf("  t   t%s parm%d;   n", var_type[i], i);
        }
        printf("  t   tinput >> id;  n");
        printf("  t   ttwin — CAST(RpcClient *, SharedThang: :get(id) );   n");
        printf("  t   tinput.set(&twin—>translation);   n");
        printf("  t   tinput >> id");
        for (i = 1; i <= nformals; i++)
                if (direction[i]== "in" || direction[i] —— "both")
                        printf(" >>parm%d", i);
        printf(";  n");
        printf("  t   tthe%s = CAST(%s *, SharedThangs: :get(id) );   n", class, class);
        printf("  t   t%s(the%s, $3, class);
        for (i = 1; i <= nofrmals; i++) {
                printf(", parm%d", i);
        }
        printf(");  n");
        printf("  t   toutput << (int) LPC_SUCCESS");
        for (i = 1; i <= nformals; i++)
                if (direction[i] == "out" || direction[i] == "both")
                        printf(" << parm%d", i);
        printf(";  n");
        printf("  t}  n  tcatch (Exception &e) {  n");
        printf("  t   toutput << (int) LPC_FAILED << @;  n");
        printf("  t}  n  tcatch (Thread &t) {  n");
        printf("  t   toutput << (int) LPC PENDING;  n");
        printf("  t}  n  treturn put(args, output);  n)  n");
}
@EOF
cat > $OZDIR/clnt.awk <<'@EOF'
BEGIN {
    printf("#include <CCTandem/XdrBuffer.h>   n");
    printf("#include <Oz/SharedThangId.h>   n");
    printf("#include <Oz/RpcClient.h>   n");
}
{
```

```
            rstart=index($2, "(");
            for (j = length($2); j >= 1; j--)
                    if (substr($2, j, 1) == ")") break;
            rlength=j - rstart + 1;
            args=substr($2, rstart+1, rlength-2);
            if (args == "void") {
                    nformals = 0;
            }
            else {
                    nformals=split(args, formals, ",");
            }
            printf("   nvoid   n%s", substr($2, 1, rstart)};
            sep=" ";
            do_read=0;
            for (i = 1; i <= nformals; i++) {
                    reference = index(formals[i], "&");
                    if (substr(formals[i], 1, 4) == "out ") {
                            do_read = 1;
                            direction[i] = "out";
                            var_type[i]= substr(formals[i], 5, 100);
                    }
                    else if (substr(formals[i], 1, 6) == "const ") {
                            direction[i] = "in";
                            var_type[i]= substr(formals[i], 7, 100);
                    }
                    else if (reference == 0) {
                            direction[i] = "in";
                            var_type[i] = formals[i];
                    }
                    else {
                            do_read = 1;
                            direction[i] = "both";
                            var_type[i] = formals[i];
                    }
                    printf("%s%s parm%d", sep, formals[i], i);
                    sep=", ";
            }
            printf("%s   n{   n", substr($2, rstart + length(args) | 1));
            printf("   tXdrBuffer buffer;   n");
            printf("   tRemoteId& rid = (RemoteId &) masterId( );   n");
            printf("   tu_long handle = rid.client->rwhich(  "%s  ");   n", $2);
            printf("   tbuffer << (u_int) rid.client->masterId( ) << rid.id");
            for (i = 1; i <= nformals; i++)
                    if (direction[i] == "in" || direction[i] == "both")
                            printf(" << parm%d", i);
            printf(";   n");
            printf("   trid.client->execute(handle, buffer)");
            if (do_read) {
                    for (i = 1; i <= nformals; i++)
                            if (direction[i] == "out" || direction[i] == "both")
                                    printf(" >> parm%d", i);
            }
            printf(";   n}   n");
    }
@EOF
DATE=  date
cat $OZDIR/baseList | while read base; do
        $EGREP "  $base   .C#" $OZDIR/input > $OZDIR/temp
        if test $doServer -ne 0; then
                NUKE svc_${base}.C
                echo "// generated by oz $DATE" > svc_${base}.C
                $AWK -F# -f $OZDIR/svc.awk $OZDIR/temp |
                        sed "s/ ([ &]*  ) & parm/ 1 parm/g" >> svc_$(base).C;
        fi
        if test $doClient -ne 0; then
                NUKE clnt_${base}.C
                echo "// generated by oz $DATE" > clnt_${base}.C
                $AWK -F# -f $OZDIR/clnt.awk $OZDIR/temp >> clnt_${base}.C
        fi
done
(test $doHandles -eq 0) && kill $$
NUKE $(handleBase)SvcCases.c
cat > $OZDIR/svcCases.awk <<@EOF
{
    printf("case %d | $handleOffset:   n", NR);
    printf("xdr_argument = xdr_RpcArg;   n");
    printf("xdr_result = xdr_RpcArg;   n");
    printf("local = (char *(*)-( ) ) r%s;   n",   $3);
    printf("break;   n   n");
}
@EOF
```

-continued

```
$AWK −F# −f $OZDIR/svcCases.awk $OZDIR/input > ${handleBase}SvcCases.c
NUKE ${handleBase}ClntHandles.h
cat > $OZDIR/clntHandles.awk <<@EOF
{
    printf(" "%s ", %d + $handleOffset, n",   $2, NR);
}
@EOF
$AWK −F# −f $OZDIR/clntHandles.awk $OZDIR/input > ${handleBase}ClntHandles.h
NUKE ${handleBase}Wrap.h
cat > $OZDIR/wrap.awk <<@EOF
{
    printf("_EXTERN_(RpcArg *, r%s, (RpcArg*,CLIENT*));   n",    $3);
}
@EOF
$AWK −F# −f $OZDIR/wrap.awk $OZDIR/input > ${handleBase}Wrap.h
/* */#rm −rf $OZDIR
```

What is claimed is:

1. A structure for sharing data objects in application programs of a distributed computer system, said distributed computer system comprising first and second computers, said structure comprising:

a first application level interface, in said first computer, to a first remote procedure call mechanism;

a second application level interface, in said second computer, to a second remote procedure call mechanism;

means, in said first and second computers, for coupling said first and said second remote procedure call mechanisms, for transporting data between said first and second computers;

first means, coupled to said first application level interface, for providing a data structure representing a base class of sharable objects, each sharable object being accessible by processes in said first and second computers;

second means, coupled to said second application level interface, for providing said data structure representing said base class of sharable objects;

first means, coupled to said first application level interface, for providing data structures representing a plurality of classes of sharable objects each derived, in accordance with a hierarchy of classes, from said base class, each sharable object in each of said plurality of classes of sharable objects being accessible by processes in said first and second computers;

second means, coupled to said second application level interface, for providing said data structures representing said plurality of classes of sharable objects;

first means, in said first computer, for constructing an inheritance tree rooted in a data structure representing said base class, said inheritance tree having data structures representing relationships among said classes of sharable objects and said base class, in accordance with said hierarchy of classes;

second means, in said second computer, for constructing said inheritance tree in said second computer;

first means, in said first computer, for traversing said inheritance tree to construct a data structure representing a relationship between a first object and a second object in said first computer, said first object being specified in a machine-independent format by a process in said second computer via said first and second remote procedure call mechanisms; and second means, in said second computer, for traversing said inheritance tree to construct a data structure representing a relationship between a first object and a second object in said second computer, said first object being specified by a process in said first computer, via said first and second remote procedure call mechanisms.

2. A structure as in claim 1, wherein each of said sharable objects comprises a server object in a selected one of said first and second computers, and a client object in the other of said first and second computers, said server and client objects communicating via said first and second application level interfaces.

3. A structure as in claim 2, wherein said server object being provided with a plurality of methods to be executed on said selected computer, and said client object accessing each of said methods via a remote procedure call over said first and second application level interfaces.

4. A structure as in claim 3, further comprising means for computing, based on said inheritance tress and using a pointer to a shared object, a pointer to either (a) a parent object containing said shared object, or (b) an included object of said parent object.

5. A structure as in claim 4, wherein said server object maintains a list of sharable objects, and wherein said client object specifies a method in one of said sharable objects in said list using an index into said list, said server object then taking said index to obtain a pointer to said method using said means for computing a pointer.

6. A structure as in claim 3, wherein said server object returns result of executing any one of said methods to said client object via said first and second application level interfaces, and said client object waits in a sleep mode until said result is received.

7. A structure as in claim 3, wherein said server object returns any error message generated during execution of any one of said methods to said client object via said first and second application level interfaces.

8. A structure as in claim 2, wherein said client object belongs to either (a) the server object's class of sharable objects, or (b) a class of sharable objects derived from said server object's class of sharable objects.

9. A structure as in claim 8, wherein said server object sends said client object a server manifest listing the server object's class and classes from which said sever object's class is derived, and wherein said client object sends said server object a client manifest listing the client object's class and classes from which said client object's class is derived.

10. A structure as in claim 2, wherein said client object creates a server communication object and a message notifying said server object creation of said server communication object, and wherein, in response to said message, said server object creates a client communication object for sending messages to said client object.

11. A method for sharing data objects in application programs of a distributed computer system, said distributed computer system comprising first and second computers, said method comprising the steps of:
   providing, in said first computer, a first application level interface to a first remote procedure call mechanism in said first computer;
   providing, in said second computer, a second application level interface to a second remote procedure call mechanism in said second computer;
   coupling said first and second remote procedure call mechanisms in said first and second computers so as to transport data between said first and second computers;
   providing a data structure in each of said first and second computers for representing a base class of sharable objects in said first and second computers and providing data structures in each of said first and second computers for representing a plurality of classes of sharable objects each derived from said base class; and
   providing, in each of said first and second computers, an inheritance tree rooted in a data structure representing said base class, said inheritance tree having data structures relating, in accordance with a hierarchy, said plurality of classes and said base class; and
   traversing, in each of said first and second computers, said inheritance tree to construct a data structure representing a relationship between a first object and a second object, whenever said first object is specified by a process in one of said first and second computers and provided to the other of said first and second computers via said remote procedure call mechanisms in said first and second computers.

12. A method as in claim 11, further comprising the step of implementing each of said sharable objects as a server object in a selected one of said first and second computers, and a client object in the other of said first and second computers, said server and client objects communicating via said first and second application level interfaces.

13. A method as in claim 12, further comprising the step of providing said client object in either (a) the server object's class of sharable objects, or (b) a class of sharable objects derived from said server object's class of sharable objects.

14. A method as in claim 13, further comprising the steps of:
   providing said server object with a plurality of methods to be executed on said selected computer; and
   accessing, from said client object, each of said methods via a remote procedure call over said first and second application level interfaces.

15. A method as in claim 14, further comprising the step of computing, in each of said first and second computers, based on said inheritance tree and using a pointer to a shared object, a pointer to either (a) a parent object containing said shared object, or (b) an included object of said parent object.

16. A method as in claim 15, further comprising the steps
   maintaining in said server object a list of sharable objects;
   specifying an index into said list, when accessing any method in one of said sharable objects in said list; and
   taking said index to obtain a pointer to said method using said step for computing a pointer.

17. A method as in claim 14, further comprising the steps of:
   returning from said server object a result of executing any one of said methods to said client object via said first and second application level interfaces, and
   waiting in a sleep mode of said client object until said result in received.

18. A method as in claim 14, further comprising the step of returning any error message generated during execution of any one of said methods to said client object via said first and second application level interfaces.

19. A method as in claim 13, further comprising the steps of:
   sending said client object a server manifest listing the server object's class and classes from which said server object's class is derived; and
   sending said server object a client manifest listing the client object's class and classes from which said client object's class is derived.

20. A method as in claim 12, further comprising the steps of:
   creating in said client object a server communication object and a message notifying said server object creation of said server communication object; and
   creating in said server object, in response to said message, a client communication object for sending messages to said client object.

* * * * *